United States Patent [19]

Ziegler

[11] Patent Number: 5,052,019
[45] Date of Patent: Sep. 24, 1991

[54] PULSE-GENERATING SENSOR UNIT FOR REMOTE SENSING SYSTEM

[75] Inventor: Horst Ziegler, Paderborn, Fed. Rep. of Germany

[73] Assignee: W. C. Heraeus GmbH, Hanau, Fed. Rep. of Germany

[21] Appl. No.: 172,702

[22] Filed: Mar. 23, 1988

[30] Foreign Application Priority Data

Apr. 25, 1987 [DE] Fed. Rep. of Germany ....... 3713956

[51] Int. Cl.$^5$ ...................... H03K 07/04; H03K 09/04
[52] U.S. Cl. ................................. 375/23; 340/870.19; 332/112
[58] Field of Search ...................... 375/23; 340/870.17, 340/870.18, 870.19, 870.23, 870.24, 825.63, 825.64; 341/87; 332/112, 113 R

[56] References Cited

U.S. PATENT DOCUMENTS

| 3,781,715 | 12/1973 | Poppe, Jr. et al. | 340/870.18 X |
| 3,872,455 | 3/1975 | Fuller et al. | 340/870.18 X |
| 4,258,421 | 3/1981 | Juhasz et al. | 340/870.16 X |

Primary Examiner—Benedict V. Safourek
Assistant Examiner—Tesfaldet Bocure
Attorney, Agent, or Firm—Frishauf, Holtz, Goodman & Woodward

[57] ABSTRACT

In a digital remote-sensing system, in which the time intervals between pulses are modulated according to the value of the parameter being measured, an overly sensitive sensing element 30 may generate a pulse outside of the desired "time window", which might then be misinterpreted. To avoid this, the sensitivity of such a digital sensing element 30, generating a frequency-modulated signal, can be reduced without intrusion into the actual sensor 32, by "thinning" the output pulses of the digital sensing element 30 with pulses of constant frequency. In the case of a sensor which, after receipt of a start-pulse, generates one or more measurement pulses, this is accomplished by specifying a part of the pulse-period in a timing stage 44, which operates in dependence on a constant-frequency auxiliary oscillator 46. The timing stage's output signal makes conductive a gating circuit 36, disposed between sensing element 30 and a downstream frequency divider 38-42, which generates the measurement pulses.

10 Claims, 3 Drawing Sheets

PULSE-GENERATING SENSOR UNIT FOR REMOTE SENSING SYSTEM

Cross-reference to related patent documents, the disclosures of which are hereby incorporated by reference:

German Patent DE-PS 31 28 706, filed July 21, 1981, issued Nov. 14, 1985, Dr. Prof. Horst Ziegler, entitled "Fuhleinheit und Anlage zur Fernmessung des Warmeverbrauches an einer Mehrzahl von Verbrauchsstellen" [Sensing Unit and Installation for Remote Measurement of Heat Consumption at a Plurality of Consumption Locations];

Commonly assigned co-pending application Ser. No. 143,567, ZIEGLER & HOENTZSCH, filed Jan. 13, 1988, and entitled SYSTEM FOR REMOTE SENSING OF A PHYSICAL PARAMETER now U.S. Pat. No. 4,916,643, issued Apr. 10, 1990.

The present invention relates generally to digital systems for remote measurement of temperature and other physical parameters, and more particularly to a sensing unit which provides automatic scaling of the measurement signal, so that an entire measurement range will fall within a predetermined time window, regardless of sensitivity variations among individual sensors.

My earlier sensing system design is described in the aforementioned German Patent DE-PS 31 28 706. It is specially equipped with a plurality of similarly constructed sensor units connected to a common signal bus, which in turn is connected to a control/evaluation unit. When the control/evaluation unit places a measurement-cycle-initiating start pulse on the signal bus, the various sensors provide, on the data bus, measurement pulses, whose temporal spacing represents the magnitude of the measured quantity of the respective sensor unit. Further, the various sensor units have differently adjusted delay circuits, so that measurement pulses generated by various sensor units are interleaved in such a way that no overlapping of measurement pulses occurs.

Typically, such known sensor units contain, as the sensor element, a quartz oscillator whose oscillation frequency is dependent upon temperature. Since the temperature range of such quartz oscillators is, as a rule, small, one operates with large basic time intervals between measurement pulses, so that the measurement pulse positions need not be determined with excessively high time resolution, and so that cheaper circuit components will therefore suffice.

For many applications, it is necessary to connect to the common signal bus, not only sensor units, the absolute position of whose measurement pulses, with respect to the start pulse, alters only slightly in dependence upon the measured quantity, but also sensor units, the position of whose measurement pulses depends strongly upon the quantity to be measured. In the latter category fall, particularly, sensor units having a variable electrical resistance with a downstream voltage/frequency divider, a moving coil with associated bridge circuit and voltage/frequency divider for the voltage taken off the null branch of the bridge, or similar measurement value transducers.

In order to assure that one can eliminate overlapping of pulses, even when using such sensor units, the windows in the time scale or range, within which the position of a measurement pulse of a respective sensor unit can change, over the measurement range of the measured quantity, had to be all chosen very large. Given a predetermined length of the measurement cycle (interrogation of all the sensor units connected to the signal bus), only a relatively small number of sensing units could be connected to the signal bus. Or, in other terms: given a particular number of sensing units connected to a signal bus, the total length of a measurement cycle grows in direct proportion to the width of the window, within which the position of the measurement pulse can change.

For many applications, in which both sensing units whose measurement pulses deviate strongly according to the measured quantity, and sensing units whose measurement pulses deviate weakly according to the measured quantity, are to be connected to a common signal bus, the great precision of measurement, made possible by strongly frequency-dependent operating sensing units, is not needed. In such a case, one could contemplate reducing the deviation range of the position of the measurement pulse by reducing the sensitivity of the analog portion of the sensing element. This has the disadvantages that the general redution in sensitivity of the sensing elements brings with it a degradation of the signal-to-noise ratio, and often brings one into the nonlinear initial section of the sensor characteristic curve.

THE INVENTION

The present invention provides a sensing unit in which the parameter-dependent deviation in the position of the measurement pulse, i.e. the sensitivity, is scaled down, without having to modify the sensitivity of the actual analog sensor responsive to the physical parameter.

Briefly, this is accomplished by using a timing stage to process the digital pulses from the analog-to-digital converter so that they will fall within the desired time window.

The sensitivity is reduced by weakening or "watering down" the influence of the actual sensing element on the position of the measurement pulse, using "thinning" pulses of constant frequency. Thus, no intrusion into the actual analog sensor is necessary. The basic character of the sensor response curve remains unchanged, and the reduction of the effective sensitivity of the sensing element can be adjusted within very broad limits.

The weakening of the influence of the frequency of the sensing element output pulses on the formation of the measurement pulses can in practice be done in two ways:

The time between the start pulse and the generation of a measurement pulse consists of a fixed, non-parameter-dependent period and a period required for generation of a few sensing element output pulses. This permits one to fit within the time window provided with a smaller number of sensing element output pulses. Due to the smaller number of sensing elements used, the deviation range in the position of the measurement pulses is correspondingly smaller.

Instead, one can in effect thin out the parameter dependent sensing element output pulses with pulses of constant frequency. Both kinds of pulses are fed to a frequency divider whose divisor ratio is raised according to the frequency of the oscillator generating the thinning pulses. Thus one obtains a percentage reduction of the sensing element output pulses and generates a measurement pulse within the predetermined time window. Use of a second frequency divider permits one to adjust the first time period very finely and precisely, and to reproducibly maintain it.

Use of automatic setting of the content of the divisor ratio memory in the frequency dividers permits, with a single adjustment, reducing the sensitivity of the sensing unit to assure that the measurement pulse falls within the time window provided.

DRAWINGS

DETAILED DESCRIPTION

Figure 1:
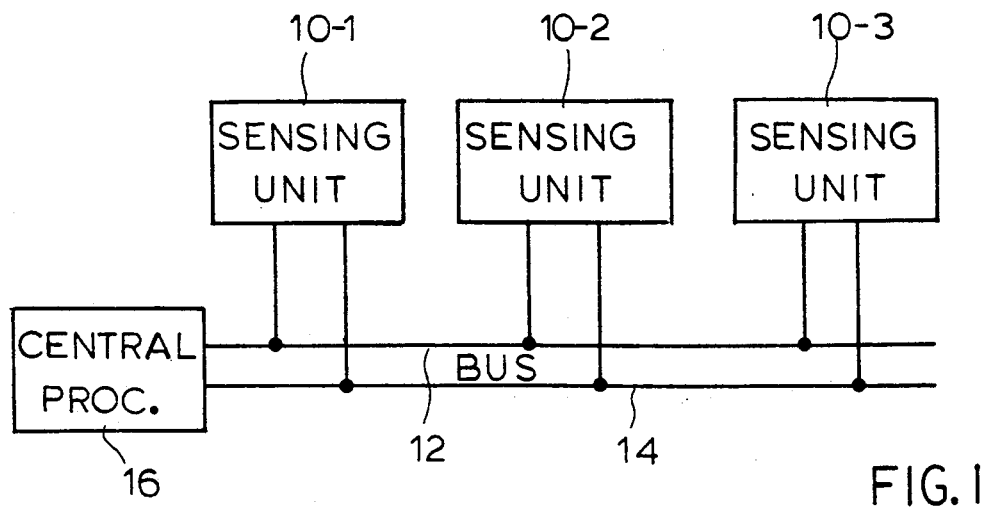
FIG. 1 is a block diagram of a measuring apparatus with a plurality of sensing units 10 connected to a signal bus.

FIG. 1 shows a measuring apparatus, in which three sensing units 10-1, 10-2, and 10-3, and other sensing units (not shown), forming a total of i sensing units, are connected to a common signal bus, comprising conductors 12, 14. A control-and-evaluation or central processing unit 16 is also connected to conductors 12, 14. Unit 16 places on bus 12, 14 pulses which control the operation of sensing units 10-$i$, and receives from bus 12, 14 measurement pulses which sensing units 10-$i$ place on bus 12, 14 in a time-displaced, interleaved manner. Control/evaluation unit 16 generates a start-pulse which initiates a measurement cycle, and the phase position of the measurement pulses with respect to this start-pulse, or also the time interval between successive measurement pulses generated by the same sensing unit, represents the magnitude of the parameter being measured by the respective sensing unit.

First of all, it is to be understood that the interval between the start-pulse and the first pulse generated by each respective sensing unit represents the magnitude of the parameter measured by that sensing unit.

Figure 2:
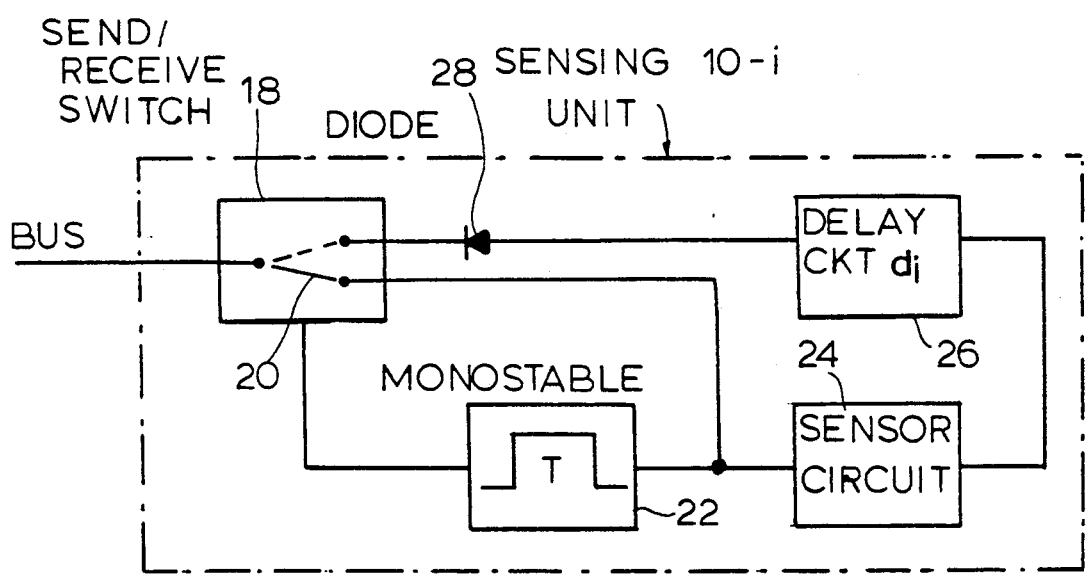
FIG. 2 is a block diagram of one of the sensing units 10 of the apparatus shown in FIG. 1.

As FIG. 2, indicates, each sensing unit 10-$i$ has a send/receive switch 18, schematically indicated as a transfer switch. Upon switching on of the measuring apparatus, and after running of each measuring cycle, the switching element 20 of switch 18 is disposed in the position shown in FIG. 2, so that a start-pulse generated by control/evaluation unit 16 for initiation of a measuring cycle is applied to the input of a mono-stable flip-flop 22. This generates a pulse of length T (the length of the measuring cycle), by means of which the switching element 20 is brought into the position shown by the dashed line of FIG. 2. Thus, after the beginning of a measuring cycle, no new pulses on the signal bus can be applied to mono-stable flip-flop 22.

A start-pulse generated by control/evaluation unit 16 is applied not only to mono-stable flip-flop 22, but also simultaneously to a sensor circuit 24, which contains a sensing element responsive to a parameter e.g. temperature, to be measured and various electrical circuits which will be described in more detail below. In general terms, sensor circuit 24 operates in such a manner that, upon receipt of a start-pulse, it generates a single measurement pulse, whose interval or time displacement from the start-pulse represents the magnitude of the parameter to be measured.

Each measurement pulse is delayed in a delay circuit 26 by a respective period of time $d_i$, whose length is characteristic of the respective sensing unit 10-$i$ which generated the pulse. In this manner, the simultaneous placement on the signal bus of measurement pulses from different sensing units is avoided.

The measurement pulse, thus delayed the characteristic period $d_i$ by delay circuit 26, travels through a diode 28 and the switching element 20 onto the signal bus and thus can be received by control/evaluation unit 16 for evaluation of its displacement from the start-pulse. The components of the signal delays resulting from the lengths of the respective signal paths, from the respective sensing units to evaluation unit 16, can be compensated for by correction signals, established ahead of time by calibration measurements.

Figure 3:
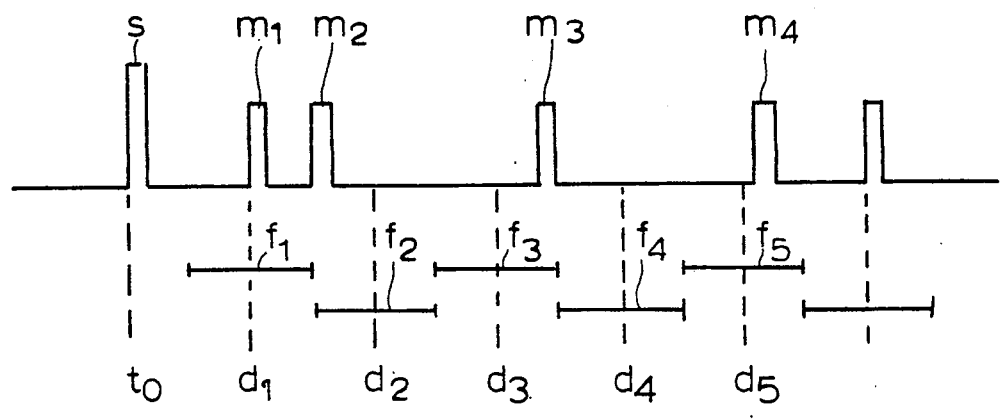
FIG. 3 is a segment of the trace of the voltage on the signal bus 12, 14 of the apparatus of FIG. 1.

The aforementioned structure of sensing units 10-$i$ assures that, in every measurement cycle, each sensing unit will generate its respective measurement pulse at the precise time necessary for individual measurement pulses to stagger or interleave, as shown in FIG. 3.

In FIG. 3, s designates the start-pulse generated in the control/evaluation unit 16 at time $t_o$ and $m_1$, $m_2$, etc. designate the respective measurement pulses generated by sensing units 10-1, 10-2, etc. Whenever the parameters to be measured are at the middle of their respective measurement ranges, the measurement pulses will occur at respective instants $t_o + d_i$. However, since in practice the parameters to be measured usually deviate, at any given instant, from the middle of their respective measurement ranges, the measurement pulses $m_1$, $m_2$, etc. will not be generated exactly at instants $t_o + d_1$, $t_o + d_2$, etc., but rather will fluctuate in their positions about those instants. If one allocates the time available within a measurement cycle equally among the various sensing unit, so that the relation $d_i = i \times d$ holds, then each measurement pulse $m_i$ may deviate or fluctuate within a "window" $f_i$, whose center lies at $t_o + d_i$ and whose width is exactly d. Under the conditions or relationships shown in FIG. 3, sensing unit 10-1 generates its measurement pulse at the center or middle of window $f_1$, while sensing unit 10-2 generates its measurement pulse $m_2$ at the beginning of window $f_2$, and measurement pulse $m_3$ occurs at the end of window $f_3$.

If one were to have a sensing unit 10-4, with a very highly sensitive sensing element, and a correspondingly strong deviation range of its measurement pulse $m_4$, it could happen that measurement pulse $m_4$ would fall outside of a window $f_4$ of standard width d, chosen in view of the deviation range of the overwhelming majority of types of sensing units connected to conductors 12, 14. As shown in FIG. 3, measurement pulse $m_4$ would then fall in window $f_5$, and would be attributed by control/evaluation unit 16 to an incorrect sensing unit and associated with an incorrect measurement value. It is therefore necessary that the sensitivity of sensing unit 10-4 be so weakened, that nowhere, within the entire measurement range of the parameter, will a resulting measurement pulse fall outside of window $f_4$. Details of the structure of such a sensor will be described below, with reference to FIGS. 4 and 5.

Figure 4:
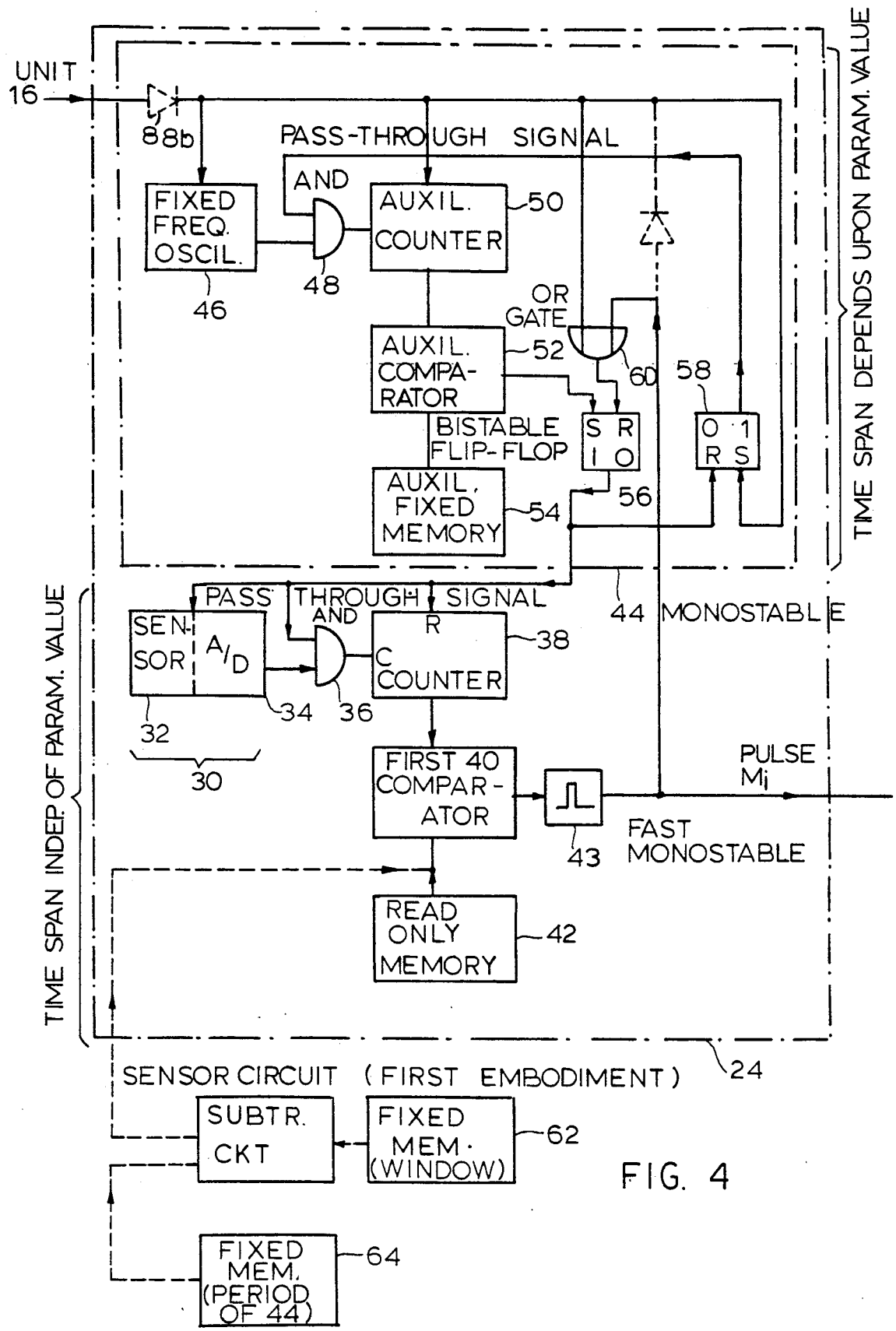
FIG. 4 is a block diagram of the actual sensor circuit of the sensing unit shown in FIG. 2.

FIG. 4 illustrates a sensing unit 24 having a sensing element 30, including a sensor 32 and a converter 34, which turns the output signal of sensor 32, generally amplitude modulated, into a pulse train, whose frequency corresponds to the instantaneous value of the parameter being measured.

The pulses generated by converter 34 travel through an AND-gate 36 to the counting input C of a digital counter 38. The data output terminals DO of counter 38 are connected to a first input terminal of a comparator 40, whose second input terminal is connected to the output of a fixed memory 42 such as a read-only memory (ROM).

Counter 38, comparator 40, and fixed memory 42 together form a first frequency divider, whose divisor ratio is determined by the contents of memory 42. At the output of comparator 40, one thus obtains a low-frequency signal, which corresponds to the instantaneous value of the parameter just as much as the frequency of the pulses generated by sensing element 30.

This comparator output signal is applied to the input of a fast monostable multivibrator 43, whose output pulse represents the measurement pulse $m_i$.

The second input of AND-gate 36 is driven by the output of a mono-stable flip-flop 44, whose input receives the start pulse of control/evaluation unit 16 via switching element 20.

Mono-stable flip-flop 44 contains a free-running, fixed-frequency oscillator 46, whose clock pulses are applied, via an AND-gate 48, to the count terminal C of an auxiliary counter 50. The data outputs DO of auxiliary counter 50 are connected to the inputs of a auxiliary comparator 52, which also receives the output signal of a auxiliary fixed memory 54. The circuits 50 through 54 thus form, again, a second frequency divider whose divisor ratio is determined by the content of auxiliary fixed memory 54.

The output signal of auxiliary comparator 52 sets a bi-stable flip-flop 56, whose "1" output serves as the "pass-through" signal for AND-gate 36. The "1" output signal of bi-stable flip-flop 56 also serves to reset a further bi-stable flip-flop 58, whose "1" output serves as the "pass-through" signal for AND-gate 48.

The setting of bi-stable flip-flop 58, the resetting of bi-stable flip-flop 56 (via an OR-gate 60), the resetting of auxiliary counter 50 and the resetting of a phase synchronizer adjuster in oscillator 46 is accomplished by the start-pulse s provided by control/evaluation unit 16. In order to assure that sensing unit 24 responds to each received start-pulse with only a single measurement pulse, the output signal of sensing unit 24 is used for resetting of bi-stable flip-flop 56, via OR-gate 60.

In general terms, the sensing unit shown in FIG. 4 operates as follows: after receipt of a start-pulse, the "1" output signal of bi-stable flip-flop 56 remains low until the state of auxiliary counter 50 corresponds to the content of auxiliary fixed memory 54. This time span is fixed, independent of the instantaneous value of the parameter to be measured. As the "1" output of bi-stable flip-flop 56 goes high, counter 38 is reset, the phase position of sensing element 30 is adjusted to zero, and AND-gate 36 becomes conductive. Now pulses pass through AND-gate 36 to counter 38, and once its count state reaches the content of fixed memory 42, one obtains a measurement pulse at the output of comparator 40.

The time span between the receipt of the start-pulse and the generation of the measurement pulse thus is composed of a "dead time" independent of the parameter being measured and a time span characteristic of the instantaneous value of the parameter being measured.

Since the control/evaluation unit 16 evaluates only the absolute position of the measurement pulse in relation to the start-pulse, it regards the sensing unit provided with mono-stable toggling or timing stage 44 as one with reduced sensitivity, compared to a sensing unit including only circuits 30 through 43.

In practice, the value contained in fixed memory 42 is chosen such that the deviation in the position of the measurement pulse which is obtained by sweeping out the desired measurement range of the measured quantity, . . . is somewhat smaller than the standard window $f_i = d$. Given such a content in fixed memory 42, the middle of the deviation range generally falls before the middle of the window, and, in order to shift the measurement pulse back to the middle of the window, a parameter-value-independent base time period is added back to the parameter-value-dependent time span which was excessively shortened by sensitivity reduction. The contents of auxiliary fixed memory 54 is correspondingly adjusted.

One recognizes that the circuit of FIG. 4 represents, in principle, the concatenation of a mono-stable timing stage operating independently of the parameter and a mono-stable timing stage with a period dependent upon the parameter. It is understood that one could reverse the sequence of these stages without altering the result.

By provision of the mono-stable timing stage 44, the sensitivity of a sensing unit can be matched to a predetermined measurement window f. An important feature is that this matching occurs without any physical influencing of sensor 32, so that the real sensor characteristic curve remains unchanged, and that no changes in or at converter 34 need be undertaken. The adjustment can be made in fine increments and can be set quickly within wide limits; one needs only to modify the contents of both fixed memories 42 and 54. This can be accomplished simply if these fixed memories are read/write or Random-Access Memories (RAM). This can also be very simply accomplished if one uses a Programmable Read-Only Memory (PROM), Erasable Programmable Read-Only Memory (EPROM) or Electrically Erasable Programmable Read-Only Memory (EEPROM).

When it is not a particular objective to adjust sensitivity without physical intrusion into sensing unit 24, one can also use resistance and wire bridge arrangements, from which specified resistances or wire bridges have been selectively cut, to make the fixed memory.

As is apparent from the foregoing description of adjustment or setting of the memory contents of fixed memories 42 and 54, these memory contents aren't independent of each other, but can be adjusted in opposite directions. One can thus reduce the adjustment process to the adjustment of a single fixed memory. For the sake of simplicity, let it be assumed that oscillator 46 generates a frequency like that generated by sensing element 30 at the middle of the measurement range to be covered.

As shown in phantom in FIG. 4, one can provide a first fixed memory 62, which contains an electrical signal corresponding to standard window width $f_i = d$. A second fixed memory 64 contains an electrical signal which is characteristic of reduction of sensor sensitivity to such a degree that the deviation range of the measurement pulse is always smaller than the measurement window In general terms, the content of fixed memory 64 is associated with the length of the period of mono-stable timing stage 44: the more strongly the sensitivity of sensing element 30 must be reduced, the longer the period of the monostable timing stage 44 must be. Fixed memory 64 can thus be connected in place of fixed memory 54 to auxiliary comparator 52. The output signals of both fixed memories 62,64 are further applied to the two inputs of a subtraction circuit 66, whose output signal is applied to comparator 40 in place of the output signal of fixed memory 42.

Figure 5:
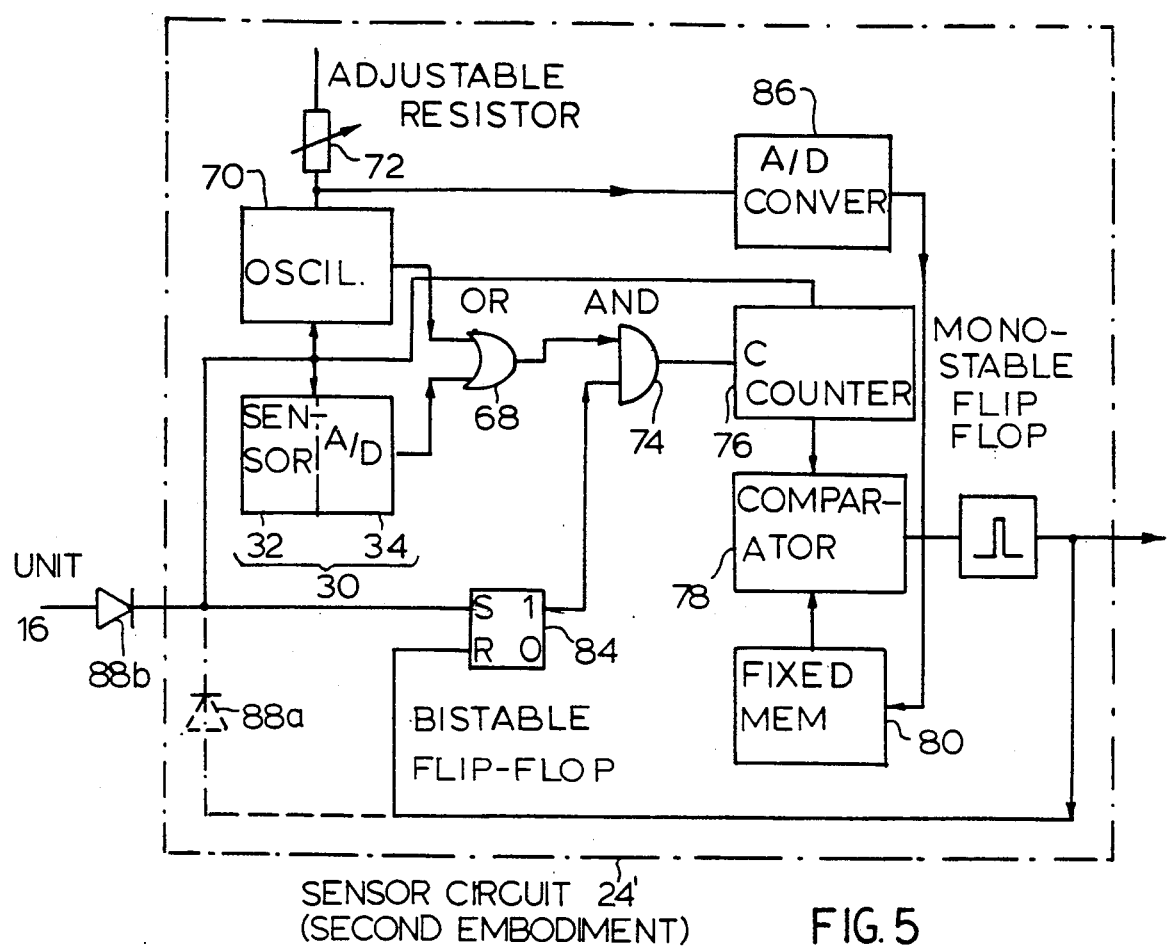
FIG. 5 is a block diagram of a modified sensor circuit of the sensing unit shown in FIG. 2.

FIG. 5 illustrates a modified sensor 24', in which the sensitivity reduction for sensing element 30 is achieved by "thinning" the measured-parameter-dependent output pulses with parameter-independent pulses.

For this purpose, the sharp output pulses of sensing element 30 are applied to a first input of an OR-gate 68, to whose second input are applied sharp output pules of a free-running oscillator 70. The oscillator's operating frequency is adjustable by means of an external element, shown in FIG. 5 as an adjustable resistance 72.

The pulses obtained at the output of OR-gate 68 pass through an AND-gate 74 and are applied to the count input C of a counter 76. The counter's Data Output Do is connected to a comparator 78, which obtains a reference signal from a fixed memory 80. The circuits 76–80 form, again, an adjustable frequency divider.

The second input of AND-gate 74 is connected to the "1" output terminal of a bi-stable flip-flop 84. The flip-flop's SET input terminal S is triggered by a start signal generated by control/evaluation unit 16. This start signal, again, defines the phase position of sensing element 30 and of oscillator 70. The resetting of bi-stable flip-flop 84 is achieved by means of the output signal of comparator 78, which is also the output signal of sensing unit 24'.

If one were to increase the operating frequency of oscillator 70, without changing the content of fixed memory 80, the output signal of comparator 78 would be received sooner. In order to assure reaching a target of the middle of the measurement window, at which the measurement pulse should be obtained when the measured parameter is at its median value, the content of fixed memory 80 must be set high. This high-setting of the content of fixed memory 80, in dependence upon the operating frequency of oscillator 70, can be automatically achieved by passing the output signal of adjustable resistance 72 to a analog-to-digital (A/D) converter 86, whose output signal is then used for addressing fixed memory 80. In fixed memory 80 are stored various signals which specify different divisor ratios of the frequency divider formed by circuits 76 through 80.

If oscillator 70 operates at a very high frequency and if the content of fixed memory 80 is thus a correspondingly high number, clearly the parameter-dependent pulses generated by sensing element 30 will contribute only slightly to the formation of the output signal of comparator 78. The sensitivity of sensing element 30 is therefore substantially reduced. Conversely, if oscillator 70 operates at only a low frequency, the content of fixed memory 80 will be set at a low value, and the phase position of the measurement pulses emitted from comparator 78 will fluctuate strongly in dependence upon the frequency of the pulses generated by sensing element 30. Here also, a fine adjustment of the sensitivity of transmitter 24 is possible, over a wide range, without intrusion into the actual digital sensor 32.

The output signal of comparator 78 triggers, again, a fast monostable flip-flop 82, whose output signal represents the measurement pulse. This signal is simultaneously used for re-setting of bi-stable flip-flop 84, i.e. for preparation of sensor 24' for the next measurement cycle.

As a modification of the above-described sensors 24 and 24', one can feed their output signals through a diode 88a to the start-input, as shown by dashed lines in FIGS. 4 and 5. The sensors then generate consecutive measurement pulses, whose time interval is a conductor-influence-independent measure of the parameter to be measured. This is simple for the control/evaluation unit to evaluate. In this case, the period of monostable switching stage 22 is lengthened to last for at least two periods of complete measurement pulses.

The start pulses generated at intervals by the control/evaluation unit clear the various counters and frequency dividers of sensor 24 or 24' to zero, so that in any case at the beginning of a new measurement cycle, a phase synchronization of the various sensing units occurs, regardless of how large the instantaneous or actual value of the measured parameter is. A blocking diode 88b prevents measurement pulses from feeding back to the sensor start input, from which they could again reach mono-stable switching stage 22. Diodes 88a and 88b together form, in effect, an OR-gate, through which the send/receive switch 18 or sensor output can place signals on the start- or synchronization-bus of the sensor.

Figure 6:
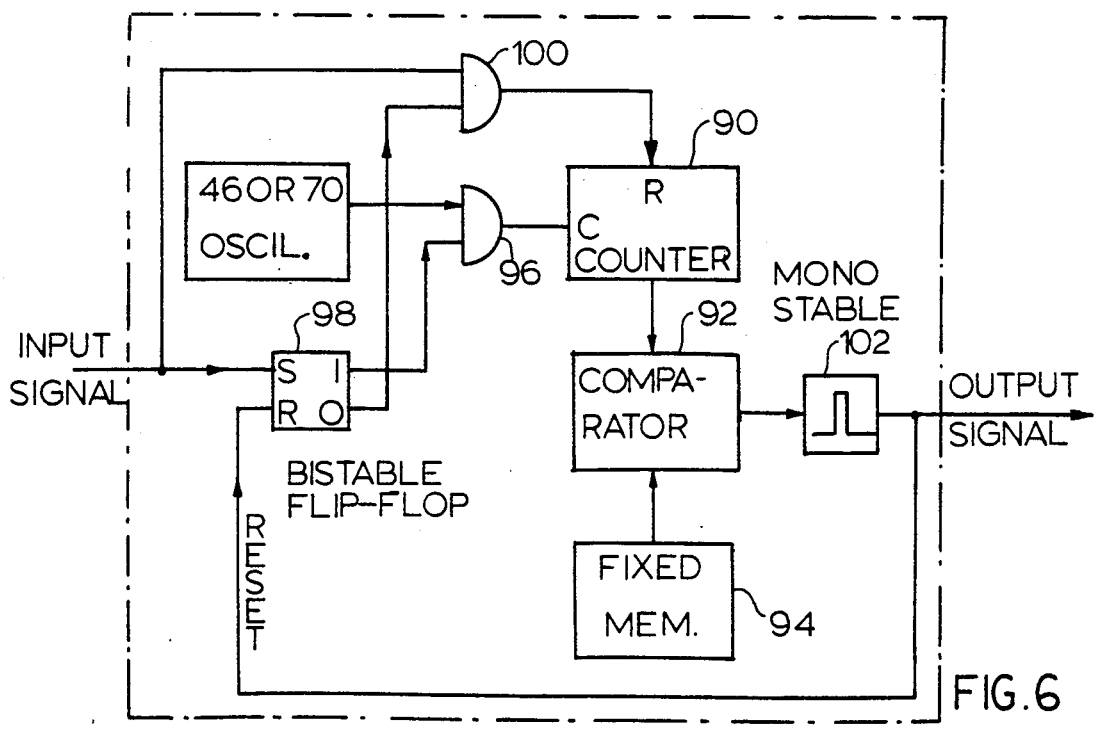
FIG. 6 is a block diagram of a delay circuit of the sensing unit shown in FIG. 2.

FIG. 6 illustrates details of a delay circuit 26, which operates independently of the measured parameter value, as previously described above.

A counter 90, a comparator 92, and an adjustable fixed memory 94 again form together an adjustable frequency divider, which receives an input via an AND-gate 96 of a constant frequency, which can for example be taken off an auxiliary oscillator 46 or 70. The conduction of AND-gate 96 depends upon the "1" output signal of a bi-stable flip-flop 98, whose SET input S is connected with the input of the delay circuit, i.e. receives the pulses coming from sensor 24 or 24'. These pulses are also fed via an AND-gate 100 to the RESET input R of counter 90. The other input of AND-gate 100 receives the "0" output signal of bi-stable flip-flop 98. The resetting of bi-stable flip-flop 98 is accomplished by means of the output signal of the delay circuit. The output signal is generated by a fast monostable flip-flop 102, whose input is connected with the output of comparator 92, and whose output also is the output of the delay circuit. One thus obtains for each input pulse an output pulse delayed by a time interval which is specified by the content of fixed memory 94.

Those skilled in the art will appreciate that numerous changes and modifications are possible within the scope of the inventive concept, and that features of one embodiment may be used together with features of another embodiment. Accordingly the scope of the invention is to be determined by the appended claims, rather than any particular embodiment.

I claim:

1. Sensing unit 10-$i$ for a parameter measurement system (10, 12, 14, 16) which unit, after each receipt of a start pulse, generates a measurement pulse, the time interval between said start and measurement pulses representing the instantaneous value of a parameter being measured, having a digital sensor (30) which generates, at its output, measurement pulses ($m_i$) at a frequency corresponding to the instantaneous value of said parameter being sensed;

a first frequency divider (38–42), having an input connected to said output of the digital sensor (30), and including a counter (38; 76); and a gating circuit (36) between digital sensor (30) and said first frequency divider (38–42), said gating circuit (36) alternately blocking output pulses from said sensor (30) and becoming conductive in response to a start pulse (s), further comprising a fixed-frequency oscillator (46; 70) having an output connected to an input of said counter, whose output pulses are combined in said counter (38; 76) for sensing-unit-sensitivity-adjustment purposes with the output measurement pulses of said digital sensor (30) in such a way that a deviation range, of the position of the measurement pulse ($m_i$) about a middle position value ($t_o + d_i$), which value is the sum of a time value $t_o$ corresponding to a parameter value centered in a possible range of said parameter and a staggering delay interval characteristic of a respective sensing unit (10-$i$) in said measurement system is smaller than a predefined standard time window ($f_i - D$) for each sensing unit's measurement.

2. Sensing unit according to claim 1, wherein said oscillator (46) forms part of a timing stage (44) which responds to said start pulse (s) and said measurement pulses ($m_i$) by generating output signals which actuate said gating circuit (36) and said frequency divider (38–42), and wherein said first frequency divider (38–42) has a preselected ratio by which it divides its input signal.

3. Sensing unit (10-$i$) according to claim 2, wherein said timing stage (44) includes a second frequency divider (50–54) having an input connected to the output (46,48) of said oscillator, and an output connected to said gating circuit (36) and to said first frequency divider (38–42), said second frequency divider including a counter (50) having a counting input connected to an output of said oscillator, and an output, an adjustable memory (54) having an output, and a comparator (52) having respective inputs connected to said outputs of said counter (50) and of said adjustable memory (54), and an output whose signal constitutes the output of said second frequency divider (50–54).

4. Sensing unit according to claim 2, wherein said first frequency divider (38–42) comprises a counter (38) connected to, and receiving the output pulses of, said digital sensor (30), an adjustable memory (42) which specifies the ratio by which said first frequency divider divides, and a comparator (40) having respective inputs connected to outputs of said counter (38) and of said adjustable memory (42), and an output whose signal constitutes the output of said first frequency divider (38–42).

5. Sensing unit 10-$i$ for a parameter measurement system (10, 12, 14, 16) which unit, after each receipt of a start pulse, generates a measurement pulse, the time interval between said start and measurement pulses representing the instantaneous value of a parameter being measured, comprising a digital sensor (30) which generates measurement pulses ($m_i$) at a frequency corresponding to the instantaneous value of said parameter being sensed;

a first frequency divider (38–42) downstream of the digital sensor (30), said first frequency divider (38–42) including a counter (38) connected to, and receiving the output pulses of, said digital sensor (30), a first adjustable memory (42) which specifies the divisor ratio of said first frequency divider, and a first comparator (40) having respective inputs connected to outputs of said counter (38) and of said adjustable memory (42), and an output whose signal constitutes the output of said first frequency divider (38–42);

a gating circuit (36) between digital sensor (30) and said frequency divider (38–42), said gating circuit (36) becoming conductive in response to a start pulse (s), a fixed-frequency oscillator (46; 70), whose output pulses are combined in said counter (38; 76) with the output pulses of said digital sensor (30) in such a way that a deviation range of the position of the measurement pulse ($m_i$) about a middle position value ($t_o + d_i$) is smaller than a predefined standard window ($f_i = D$), said fixed-frequency oscillator (46) forming part of a timing stage (44) which responds to said start pulse (s) and to said measurement pulses ($m_i$) by generating output signals which actuate said gating circuit (36) and said first frequency divider (38–42), and wherein said timing stage (44) includes a second frequency divider (50–52) having an input connected to the output of said oscillator (46; 70), and an output connected to said gating circuit (36) and to said first frequency divider (38–42), said second frequency divider including a second counter (50) connected to an output of said oscillator (46), a second adjustable memory (54), and a second comparator (52) having respective inputs connected to outputs of said counter (50) and of said second adjustable memory (54), and an output whose signal constitutes the output of said second frequency divider (50–54), and wherein the divisor ratios of said first and second frequency dividers, and thus the contents of said first and second adjustable memories (42, 54), can be adjusted in opposite directions.

6. Sensing unit according to claim 5, wherein the divisor ration of at least one of said first and second frequency dividers is set by an electrical signal generated in a subtraction circuit (66) having a pair of inputs connected to respective memories 62,64), one memory being set according to a reduction in sensor sensitivity needed to keep said deviation range within said predefined standard window, and the other memory being set according to width of a standard measurement signal time window.

7. Sensing unit (24') according to claim 1, further comprising an auxiliary oscillator (70) and a frequency divider (76–80) and including means (72), connected to an input of said auxiliary oscillator, for adjusting the ratio by which said frequency divider divides, and wherein the output pulses of said digital sensor (30) and of said auxiliary oscillator (76–80) are commonly fed to said frequency divider (76–80).

8. Sensing unit according to claim 7, wherein the divisor ratio of said frequency divider (76–80) is adjusted in dependence upon the output signal of an adjustment member (72) connected to said auxiliary oscillator (70).

9. Sensing unit according to claim 8, wherein said frequency divider (76–80) comprises a counter (76) receiving superimposed (68) pulses from said digital sensor (30) and said auxiliary oscillator (70), an addressable memory (80) specifying a divisor ratio by which said frequency divider divides any input signal which it receives, and a comparator (78) having respective inputs connected to outputs of said counter (76) and to said memory (80), and an output whose signal constitutes the measurement pulse ($m_i$), and wherein a signal (84) from said adjustment element (72) of said auxiliary oscillator (70) is used for addressing said divisor-ratio-specifying memory (80).

10. Sensing unit according to claim 1, wherein said parameter being measured is temperature.

* * * * *